US00RE42891E

(19) United States
(12) Reissued Patent
Diesel

(10) Patent Number: US RE42,891 E
(45) Date of Reissued Patent: Nov. 1, 2011

(54) 3D AIME™ AIRCRAFT NAVIGATION

(75) Inventor: John W. Diesel, Woodland Hills, CA (US)

(73) Assignee: Northrop Grumman Guidance and Electronics Company, Inc., Los Angeles, CA (US)

(21) Appl. No.: 09/974,088

(22) Filed: Oct. 9, 2001

Related U.S. Patent Documents

Reissue of:
(64) Patent No.: 6,094,607
Issued: Jul. 25, 2000
Appl. No.: 09/200,586
Filed: Nov. 27, 1998

U.S. Applications:
(60) Provisional application No. 60/067,303, filed on Dec. 4, 1997, provisional application No. 60/083,030, filed on Apr. 24, 1998.

(51) Int. Cl.
*G01S 13/00* (2006.01)
*G01S 13/88* (2006.01)
*G01S 5/14* (2006.01)

(52) U.S. Cl. ..... 701/4; 701/1; 701/3; 701/13; 701/210; 701/213; 342/38; 342/355; 342/358

(58) Field of Classification Search ..... 701/4, 1, 701/3, 15–18; 342/33, 34, 36, 38, 120, 355, 342/357.06, 357.09
See application file for complete search history.

(56) References Cited

U.S. PATENT DOCUMENTS

| | | | | |
|---|---|---|---|---|
| 4,232,313 | A | 11/1980 | Fleishman | 343/6 R |
| 4,937,763 | A | 6/1990 | Mott | 364/550 |
| 5,250,947 | A | 10/1993 | Worden et al. | |
| 5,365,447 | A | 11/1994 | Dennis | 364/449 |
| 5,574,649 | A | 11/1996 | Levy | |
| 5,583,774 | A | 12/1996 | Diesel | 701/200 |
| 5,590,044 | A | 12/1996 | Buckreub | |
| 5,646,857 | A | 7/1997 | McBurney et al. | |
| 5,969,668 | A | 10/1999 | Young, Jr. | |
| 6,055,477 | A | 4/2000 | McBurney et al. | |

*Primary Examiner* — Yonel Beaulieu
(74) *Attorney, Agent, or Firm* — Tarolli, Sundheim, Covell & Tummino LLP

(57) ABSTRACT

The apparatus of the present invention uses radar altimeter measurements and stored terrain altitude profiles to provide pre-filtered observations to a Kalman filter for estimating barometric offset at the airport runway, and barometric scale factor for offsets above the runway. These offsets are used with the smoothed baro-inertial output from an inertial reference system to provide 3 dimensional constant rate of descent approach procedures to replace non-precision approach procedures based on constant barometric altitude step approaches. The horizontal positions used as reference for the stored terrain altitude profiles are obtained from a prior art navigation apparatus. The integrity of all measurements is assured by using long term averages of the Kalman filter residuals to detect failures. In addition, the estimated baro offset at the runway is compared for consistency with the baro offset obtained by the pilot from the airport by radio.

36 Claims, 3 Drawing Sheets

(amended)

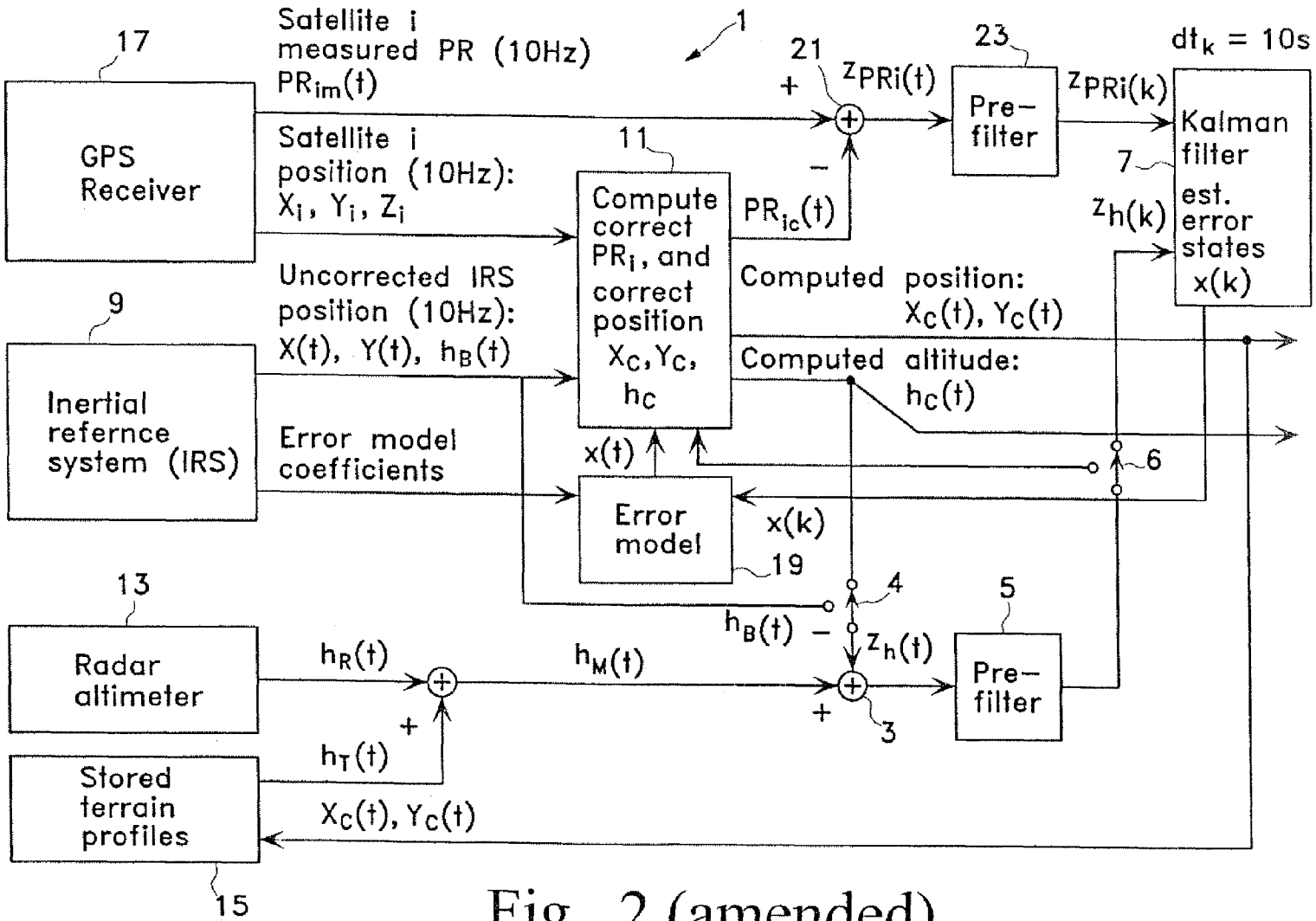
Fig. 2 (amended)

Error state vector:
1 dX
2 dY
3 dVx
4 dVy
5 dB
6 dBr
7 dhBO
8 dhB3K
9 dRB1
10 dRB2
...
16 dRB8
Dynamics matrix:
F =
dX dY dVx dVy dB dBr dhBO dhB3K dRB1 dRB8
1 0
0 1
(Note – blank elements denote zeroes)
0 1
0 0
−1/τ
....
−1/τ
Observation matricies:
Pseudo–Range observations:
HPRI =
exi eyi −1 ezi, ezi(h–h0) /3000 (−1)i
Altitude observation:
Hh =
1, (h–h0) /3000

Fig. 3

3D AIME™ AIRCRAFT NAVIGATION

Matter enclosed in heavy brackets [ ] appears in the original patent but forms no part of this reissue specification; matter printed in italics indicates the additions made by reissue.

CROSS-REFERENCE TO RELATED APPLICATIONS

This application claims the benefit of U.S. Provisional Application No. 60/067,303, filed Dec. 4, 1997, and U.S. Provisional Application No. 60/083,030, filed Apr. 24, 1998.

STATEMENT REGARDING FEDERALLY-SPONSORED RESEARCH AND DEVELOPMENT (NOT APPLICABLE)

BACKGROUND OF THE INVENTION

Th invention relates generally to aircraft navigation apparatus used during an approach, and more particularly to apparatus combining an inertial reference system (IRS) using air data inputs with the Global Positioning System (GPS) and a radar altimeter. This apparatus can be used on a worldwide basis to replace non-precision approach procedures with 3-dimensional approach procedures, without the use of any ground-based augmentation systems.

It is generally recognized that it will be many years before satellite navigation augmentation systems, such as the wide-area augmentation system (WAAS) and equivalent systems, will provide such a capability. As stated in Aviation Week magazine, 8/18/97, pp 23, 26, "nonprecision approaches are associated with 60% of the commercial airline crashes worldwide that are attributed to controlled flight into terrain (CFIT)" and "CFIT is the leading cause of fatal accidents in commercial aviation." "[I]t will be at least 10-15 years before fully autonomous, airborne navigation systems with 3-D capabilities are available to replace them".

The technology required for fully autonomous airborne navigation systems with 3-D capabilities already exists today in the proven 3D AIME™ system of the present invention. Unlike WAAS, the 3D AIME™ system will be available on a worldwide basis autonomously on the aircraft, without using any ground based navigation aids.

BRIEF SUMMARY OF THE INVENTION

By using the 3D AIME™ apparatus of the present invention, non-precision approach procedures based on 2D horizontal position with constant barometric altitude steps can be replaced by 3D constant-rate-of-descent procedures. This is achieved by using the AIME™ navigation apparatus or mechanization described in U.S. Pat. No. 5,583,774 dated Dec. 10, 1996.

The AIME™ mechanization provides accurate horizontal position, with high integrity, which is necessary for accessing stored altitude terrain profile tables along the approach path. This stored terrain profile information could be obtained from contour maps, as used to implement advanced ground proximity warning systems, or from airport surveys. These tables are used to correct radar altimeter measurements for local terrain altitude above sea level to obtain measurements $h_M(t)$ of altitude above mean sea level.

This is normally done with the help of a ground based differential GPS (DGPS) station ("Design and Flight Test of a Differential GPS/Inertial Navigation System for Approach/Landing Guidance", Journal of the ION, Vol. 38, No. 2, 1991). The differential station is normally necessary since accurate horizontal position is required in order to obtain the correct local altitude from the tables. As an example, in mountainous terrain a 200 meter error in horizontal position can easily result in a 50 meter error in altitude.

In the 3D AIME™ mechanization of the present invention, the requirement for a differential ground station is avoided. Rather than using the measurements $h_M(t)$ directly, they are used to estimate corrections to the baro-inertial output from the IRS. This corrected output is then used for the vertical position output. In this way, the measurements $h_M(t)$ over the entire approach, which can extend for 5 to 10 miles, are averaged. A 200 meter error in position will result in an altitude error of less than 20 meters, assuming that the average terrain slope in one direction during the approach is less than 10 percent. Approaches where the average slope in one direction over the entire approach exceeds 10 percent would be rare and would be known in advance.

BRIEF DESCRIPTION OF THE DRAWINGS

FIG. 2 is a diagram showing how a GPS receiver, an IRS, a radar altimeter, and stored terrain altitude profiles are processed to obtain accurate 3-dimensional position for 3D approach procedures.

FIG. 3 shows the error states, the dynamics matrix, and the observation matrices used according to the present invention in the approach Kalman filter.

DETAILED DESCRIPTION OF THE INVENTION

Figure 1:
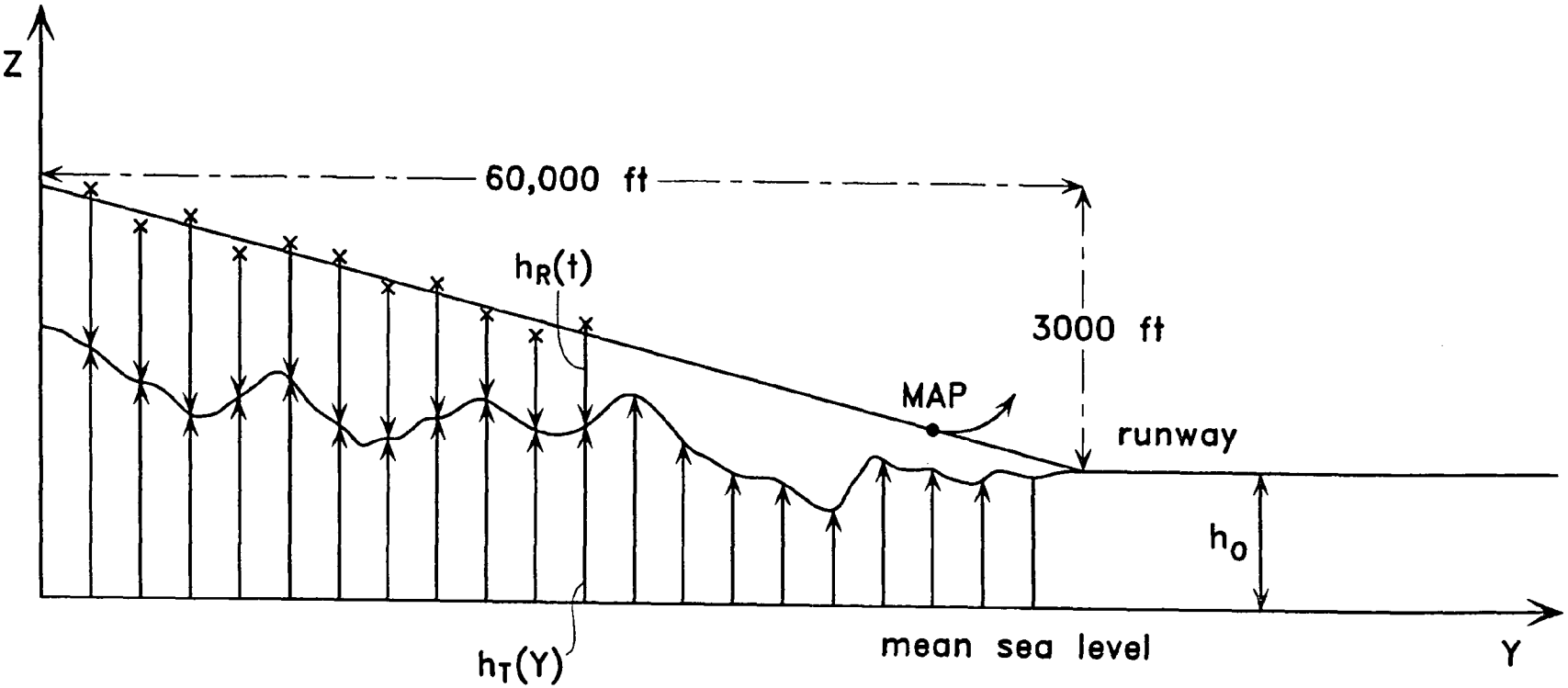
FIG. 1 is an illustration of the way that radar altimeter measurements and stored terrain profiles are used to obtain measurements of altitude above mean sea level.

The apparatus of the present invention is similar in many respects to the apparatus described in U.S. Pat. No. 5,583,774 dated Dec. 10, 1996 (the '774 patent) which is hereby incorporated by reference.

In the 3D AIME mechanization of the present invention 1 shown in FIG. 2, the measurements $h_M(t)$ of altitude above mean sea level (see FIG. 1) are first referenced to computed altitude $h_C(t)$ by adder 3 and then pre-filtered by pre-filter 5. The computed altitude $h_C(t)$, as described in the '774 patent, is obtained from computing unit 11 through switch 4. The pre-filtered measurements pass through switch 6 to Kalman filter 7 where they are used as observations in obtaining estimates of the barometric offset at the runway and the barometric scale factor offset from the runway to the aircraft present altitude. The smoothed barometric-inertial altitude from the inertial reference system (IRS) 9 is corrected by these offsets in computing unit 11 to obtain the vertical position output $h_C(t)$.

The pilot first obtains the barometric offset at the airport by radio, as provided by the weather service. The first pre-filtered observation of present altitude during the approach is differenced with this offset in Kalman filter 7 to obtain the first estimate of the barometric scale factor offset. As each new pre-filtered observation becomes available, it is used to improve the estimates of both the barometric scale factor offset and the barometric offset at the airport runway. The estimated offset at the runway will improve in accuracy as the airport runway altitude is approached, and the scale factor error has less effect. As the runway is approached, if the estimated runway offset does not agree with the offset of the runway as obtained from the weather service by radio, within a tolerance, a missed approach is initiated.

FIG. 1 is a typical example of an approach according to the present invention where the approach is initiated at a distance of 60,000 feet (approximately 10 nautical miles) from the airport at an altitude of 3000 feet above the airport. This gives a slope of 1:20, which corresponds to an approximate glideslope of 3 degrees. In FIG. 1, the vertical scale is exaggerated for illustrative purposes.

If the aircraft velocity were perfectly constant, the actual path would appear as a straight line. Assuming altitude measurements are taken at a typical rate of 10 Hz by radar altimeter 13, the measurements would be equally spaced as shown in the figure. The path of the aircraft could then be obtained by a two parameter least squares fit of a straight line, to determine the vertical intercept altitude at touchdown and the slope. This would have the effect of reducing the errors due to noise, both in the radar altimeter measurements, and in the stored terrain altitudes contained in memory 15.

Since the aircraft velocity is not perfectly constant, the noise effects cannot be reduced by a simple straight line least-squares fit, as just described. However, an almost equivalent filtering effect can be obtained by using the smoothed barometric altitude from IRS 9 as a reference to obtain altitude observations for Kalman filter 7.

The smoothed barometric altitude $h_B(t)$ from IRS 9 is obtained from a third order complementary filter, as specified in ARINC 704 for IRS outputs. This filtering provides an output whose steady state accuracy is that of the barometric altitude. Yet, the output follows almost instantaneous changes in altitude because of the high frequency accuracy of the inertial reference.

Since the output is smoothed barometric altitude, rather than altitude above mean sea level, a correction for the barometric offset difference is necessary. The barometric offset at the airport is provided by periodic weather reports. However, the offset also changes with altitude above the airport. It can be assumed that this change in offset varies approximately linearly with altitude above the airport to an altitude difference of 3000 feet.

The 3D AIME™ mechanization 1 uses the measurements in FIG. 1 to estimate the barometric offset at the airport $h_{BO}$ and the change in offset at 3000 feet above the airport, $dh_{B3000}$. As the actual altitude decreases to the altitude of the airport, the estimated offset at the airport should agree approximately with the offset provided by the airport weather reports. If this disagreement is not within a certain tolerance, depending on altitude above the airport, a missed approach is initiated at the missed approach point (MAP) as indicated in FIG. 1.

It is assumed that the AIME™ mechanization, as described in the '774 patent, has been available for the navigation phase prior to this time, with a typical horizontal protection level of 0.3 nm or better. The Kalman filter used in the navigation phase will be referred to as the Navigation Kalman Filter (NKF). It is used to initialize an Approach Kalman Filter (AKF) for the approach phase which is denoted in FIG. 2 as Kalman filter 7.

The AKF will use an update interval of 10 seconds, rather than the 150 second update interval of the NKF. The AKF will have fewer states than the NKF. These are indicated in FIG. 3. The AKF states consist of two horizontal position states dX and dY, two horizontal velocity states $dV_x$ and $dV_y$, the user clock bias dB, the user clock bias rate $dB_r$, the barometric offset $dh_{BO}(t)$, the barometric offset scale factor $dh_{B3000}(t)$, and one state for each of the satellite range bias errors $dR_{Bi}(t)$, up to a maximum of eight, as used by the NKF.

The total number of error states in the AKF is therefore 16 instead of 24, as used in the NKF. The missing 8 states are the three navigation axis misalignments, the two horizontal accelerometer bias errors, and the three gyro bias errors. These are unnecessary, since the errors due to these states will have been balanced before the approach by the Navigation Kalman filter, assuming at least 30 minutes of operation before the approach. These states cannot become unbalanced due to process noise during the approach, because the duration of the approach is less than 5 minutes.

The AKF uses updates from the same satellites as the NKF using GPS receiver 17, but in addition it uses updates from radar altimeter 13, corrected by stored terrain altitude from memory 15. As shown in FIG. 2, the corrected horizontal position output during the approach is obtained by computing unit 11 from the un-updated inertial horizontal position supplied by IRS 9, corrected by the estimated horizontal position errors supplied by error model 19.

The error model 19 obtains error estimates utilizing the dynamics matrix shown in FIG. 3 and error state correction vector x(k) supplied at ΔT time intervals by Kalman filter 7, the index k being an integer and ΔT being equal to 10 seconds. The output of the error model 19 is the error states vector x(t) supplied at Δt time intervals, the index t being an integer and Δt being equal to 0.1 second. The error states vector x(t) is obtained by integrating the differential equations described by the dynamics matrix F in FIG. 3. In matrix form these equations are $$\frac{dx}{dt} = F \cdot x \tag{1}$$

where the vectors dx/dt, and x are represented by column matrices with 16 elements, as indicated at the left side of FIG. 3. The dynamics matrix F is a square matrix with 16 rows and 16 columns, as indicated at the center and right side of FIG. 3. The error states x are initialized every 10 seconds by Kalman filter 7, and then integrated at a rate of 10 Hz, from the differential equations described by the dynamics matrix F.

Since the F matrix has mostly zero elements, the differential equations are very simple, and the non-zero error model coefficients are the constants 1 and $-1/\tau$. With this simplified dynamics matrix, these coefficients can be obtained without inputs from the IRS 9. However, in a more general case, the coefficients would be obtained from IRS 9 as indicated in FIG. 2.

As with the NKF, these corrected positions are used along with the estimated user clock bias by computing unit 11 to determine a computed pseudorange (PR) at intervals of Δt. The computed pseudoranges are differenced with the measured pseudoranges from GPS receiver 17 by adder 21 to obtain the satellite measurements $z_{PRi}$ at intervals of Δt, as shown in FIG. 2.

These differences are averaged or pre-filtered by lowpass pre-filter 23 to obtain averaged measurements at ΔT time intervals. The observation matrices involve the direction cosines exi, eyi, and ezi of the line of sight, and minus ones for the user clock bias, and the particular satellite range bias error, as indicated in FIG. 3.

The altitude measurement $z_h$ is obtained in the following way. The computed altitude above mean sea level $h_C(t)$ is obtained by computing unit 11 by applying corrections to the un-updated third order barometric-inertial loop output supplied by IRS 9. The corrections consist of the estimated barometric offset $dh_{BO}(t)$ and scale factor error $((h-h_0)/3000)\,dh_{B3000}(t)$. The measured altitudes above mean sea level $h_M(t)$ and the computed altitudes above mean sea level $h_C(t)$ are differenced by adder 3 to obtain altitude measurements $z_h(t)$ at $\Delta t$ time intervals. These differences are averaged, or pre-filtered, by lowpass pre-filter 5 to obtain averaged measurements at $\Delta T$ time intervals. The observation matrix in this case is simply 1 for the barometric offset and altitude $(h-h_0)/3000$ for the barometric scale factor, as indicated in FIG. 3.

The NKF continues to run in parallel with the AKF, without updates from the radar altimeter. This is done in case the radar altimeter measurements are determined to be unreliable, and a missed approach is initiated. The integrity of the satellite measurements is monitored in the same way as in the NKF, by using the magnitude of the long term average of the Kalman filter residuals over many update cycles as the test statistic to detect failures.

An alternative mechanization which avoids the use of a Kalman filter is also shown in FIG. 2. The uncorrected inertial reference system altitude $h_B(t)$ passes through switch 4 to adder 3 which obtains the difference $z_h(t)$ of $h_M(t)$ and $h_B(t)$. Pre-filter 5 approximates $z_h(t)$ as a low order polynomial function of time. The coefficients of this polynomial are based on a least-squares approximation to the differences $z_h(t)$ between the measured altitude $h_M(t)$, and the uncorrected inertial altitude $h_B(t)$:

$$z_h(t)=h_M(t)-h_B(t) \tag{2}$$

where the measured altitude $h_M(t)$ is obtained as the sum of the terrain altitude $h_T(t)$ and the radar-measured altitude above the terrain $h_T(t)$ as shown in the summation junction at the lower left part of FIG. 2:

$$h_M(t)=h_R(t)+h_T(t) \tag{3}$$

The least squares estimate is determined by saving all of these past measurements up to the present time t, and completely re-solving for the least-squares estimate of the polynomial coefficients at a rate of 1 Hz. These polynomial coefficients in t are passed through switch 6 to computing unit 11 where they are used to correct the inertial altitude $h_B(t)$ to obtain the best estimate $h_C(t)$ of the true altitude at 10 Hz.

When Selective Availability (SA) is present, it is anticipated that the accuracy of the vertical position information generated will be 5 meters, 95%, assuming that only the C/A code is used in civilian applications. This accurate vertical measurement will result in improved horizontal accuracy over previous systems. It is anticipated that the horizontal accuracy will be improved from 100 meters, 95%, to better than 75 meters, 95%. This corresponds to a horizontal integrity protection level (four sigma) of less than 500 feet, which permits parallel approaches with runway spacing of 1000 feet.

If used with SA turned off, which was promised by the year 2006, the present invention meets the accuracy requirements for CAT I. If used with the Wide Area Augmentation System (WAAS), or with the military P-Code, it has a vertical accuracy of 1.5 meters, 95%, which is the CAT II requirement.

The method of using tables of local terrain altitude above sea level is most easily visualized for the case of a straight approach lined up with the center line of the runway. For a given airport runway, a finite number of curved approaches will be handled in a similar way. For a straight or curved approach, if the aircraft flew directly above a line exactly along the nominal approach path, it would only be necessary to store the local terrain altitude at points along this line.

Because of horizontal steering errors and navigation sensor errors, the aircraft will deviate laterally from this line. It is therefore necessary to store local terrain altitude at points adjacent to this line. These grid points are located at the vertices of square grids along an area of finite width along the nominal approach path.

For aircraft whose horizontal position is at points within a particular square in the region covered by the grids, the particular square will be referred to as the "reference square" for that measurement. Two dimensional linear interpolation is used within the reference square, using stored terrain altitude at the four corners of the square. The terrain altitude stored at each grid point will account for the highest point within the neighboring reference squares.

Assuming the data from the radar altimeter $h_R(t)$ in FIG. 2 comes in at a rate of 10 HZ, and the aircraft speed during the approach is 150 knots, the measurements will be spaced at a horizontal distance of approximately 25 feet.

The radar altimeter measures the range to the nearest reflecting object within its beamwidth, which is as wide as 45 to 90 degrees. If the stored terrain tables are based on the terrain height without accounting for certain buildings or towers, the measured height above the local terrain will be in error for one or more seconds when near this terrain feature. This is true even though the aircraft is not directly over the feature, since the altimeter has a finite beamwidth.

The present invention will delete these measurement by using a three or four sigma rejection criterion on the individual 10 Hz. measurements. In addition, it will use a three or four sigma rejection criterion on the Kalman filter averaged measurement over the Kalman filter update interval, which may be 10 seconds in the preferred embodiment. If these terrain features are known in advance, an additional adjustment will be made to the terrain altitude stored at the grid points, so that this data rejection is unnecessary.

It is tentatively assumed that these grids cover an area 1000 feet wide, 500 feet on either side of the nominal approach path. The area covered by the grids extends up to 60,000 feet along the nominal approach. This 60,000 foot path extends from an initial point, when the aircraft initial altitude above the runway is approximately 3000 feet, to the projected touchdown point 1000 feet down the runway from the threshold. This assumes the slope of the approach path is 1:20.

Since many radar altimeters have a maximum altitude range of 2500 feet, the grids may not extend all the way to 60,000 feet, as shown in FIG. 1, depending on the local terrain altitude above sea level at this location. Only the measurements within the 2500 foot vertical range of the altimeter will be used. Similarly, whenever the aircraft is more than 500 feet laterally from the nominal approach path center, the measurements will not be used.

Since horizontal position coordinates are used as inputs, horizontal position errors will cause errors in the local terrain altitude obtained from the tables. However, the errors in horizontal position for the present invention are only 75 meters, 95%, rather than 100 meters, 95%, for GPS with SA. This improvement is a result of the effect of the accurate altitude measurement on the Kalman filter estimate of horizontal position.

To limit horizontal errors when using the present invention, an additional test is made. The residuals $z_h(t)$ in FIG. 2 are saved, together with their horizontal position coordinates. Adjustments to past residuals are made, based on horizontal position adjustments from the Kalman filter.

The root mean square, $z_{hRMS}$, of the adjusted altitude residuals $z_h(t)$ in FIG. 2 are compared with an alarm limit. If $Z_{hRMS}$ exceeds the alarm limit, this indicates an excessive horizontal position error or some other integrity problem with the data.

Additional tests would be made by shifting the stored position coordinates forward toward the runway, backward, left, or right, respectively, and re-computing the RMS residuals in each case. If one of these cases, or two cases in adjacent quadrants, provided a smaller RMS residual, this would indicate a horizontal position error.

This is similar to conventional techniques used in missile guidance terrain matching systems to obtain horizontal position fixes. However, in this case, the terrain can be smooth, so that the integrity check is not always achievable. This does not cause a problem unless the terrain has a constant slope in one direction during the entire approach. For example, over water, the surface is smooth, but horizontal position errors do not cause errors in altitude.

In addition to testing the RMS residual at 10 Hz., the RMS of residuals averaged over several cycles would be tested. In particular, the RMS of the residuals of the Kalman filter, with averaging time of 10 seconds, would be tested.

When sources of terrain altitude near the airport are available, initial altitude entries near the airport will be generated by off-line software processing of this information. The sources of such information might be published contour maps or published altitude tables.

However, because of the beamwidth of the radar altimeter, it is difficult to predict the effects of buildings and rugged terrain features by off-line processing alone. Therefore, it is also necessary to validate the process by taking radar altimeter measurements while flying the actual approach. This would be done by using an accurate external reference, such as DGPS, to determine the true position and altitude at the time of each radar altimeter measurement.

Such flights are necessary in order to prove that the entries generated by the off-line software processing can be applied to the measurements when flying the actual approach. Such flights would also be required for FAA or ICAO certification at the airport.

What is claimed is:

1. A method for determining a vehicle's altitude above a predetermined reference level utilizing values of navigation quantities from one or more external sources, an altitude being referenced to the predetermined reference level unless otherwise noted, the method comprising the steps:

(a) obtaining values of a plurality of external-source navigation quantities at periodic input intervals, the external-source navigation quantities including a first external-source vehicle altitude, *the external source for the first external-source vehicle altitude being an inertial reference system*;

(b) obtaining observations at periodic observation intervals of one or more observation quantities, at least one of the observation quantities being a function of a second external-source vehicle altitude, *the second external-source vehicle altitude being referenced to the portion of the terrain beneath the vehicle,* an observation interval containing one or more of the periodic input intervals;

(c) deriving correction data at the periodic input intervals from the observations of step (b);

(d) obtaining values of one or more corrected or computed navigation quantities at the periodic input intervals using the correction data of step (c), the one or more corrected or computed navigation quantities including a corrected first external-source vehicle attitude.

2. The method of claim 1 wherein the source for the first external-source vehicle altitude in step (a) is a barometric altimeter.

3. The method of claim 1 wherein the source for the first external-source vehicle altitude in step (a) is an inertial reference system that includes a barometric altimeter.

4. The method of claim 1 wherein the navigation quantities of step (a) include an external-source two-coordinate vehicle position, the two coordinates defining a position in the horizontal plane.

5. The method of claim 4 wherein the source for the external-source two-coordinate vehicle position in step (a) is an inertial reference system.

6. The method of claim 1 wherein the navigation quantities of step (a) include a plurality of external-source three-coordinate GPS satellite positions.

7. The method of claim 6 wherein the source for the external-source three-coordinate GPS satellite positions in step (a) is a GPS receiver.

8. The method of claim 1 wherein the navigation quantities of step (a) include a plurality of external-source pseudoranges to GPS satellites.

9. The method of claim 8 wherein the source for the external-source pseudoranges in step (a) is a GPS receiver.

10. The method of claim 1 wherein the navigation quantities of step (a) include a plurality of external-source error-model coefficients.

11. The method of claim 10 wherein the source for the external-source error-model coefficients in step (a) is an inertial reference system.

12. The method of claim 1 wherein the navigation quantities of step (a) include an external-source vehicle altitude referenced to the terrain altitude beneath the vehicle.

13. The method of claim 12 wherein the source for the external-source vehicle altitude referenced to the terrain altitude beneath the vehicle is a radar altimeter.

14. The method of claim 1 wherein the navigation quantities of step (a) include an external-source terrain altitude of the portion of the terrain beneath the vehicle.

15. The method of claim 14 wherein the source for the external-source terrain altitude is a memory in which terrain altitude is stored as a function of two-coordinate vehicle position in the horizontal plane.

16. The method of claim 1 wherein the observations of step (b) include an observation which is derived from the sums of an external-source vehicle altitude referenced to the portion of the terrain beneath the vehicle and an external-source terrain altitude of the portion of the terrain beneath the vehicle for a plurality of present and past input intervals.

17. The method of claim 1 wherein the observations of step (b) include an observation which is derived from the differences of a first external-source vehicle altitude and a second external-source vehicle altitude for a plurality of present and past input intervals.

18. The method of claim 17 wherein step (c) comprises the step:

(c1) determining a polynomial as a function of time or a function of a parameter that is a function of time that approximates the differences for a plurality of present and past input intervals, the polynomial coefficients constituting the correction data for the present input interval.

19. The method of claim 18 wherein the polynomial provides closer approximations to differences that are of a higher quality.

20. The method of claim 18 wherein a difference is ignored in the determination of the polynomial if the quality of the difference is less than a specified quality level.

21. The method of claim 17 wherein in step (d) the corrected first external-source vehicle altitude is the sum of the first external-source vehicle altitude and the polynomial value.

22. The method of claim 1 wherein the observations of step (b) include an observation which is derived from the differences of the corrected first external-source vehicle altitude and a second external-source vehicle altitude for a plurality of present and past input intervals.

23. The method of claim 22 wherein the observations of step (b) include an observation which is the sum of the weighted differences of the corrected first external-source vehicle altitude and a second external-source vehicle altitude for a plurality of present and past input intervals.

24. The method of claim 1 wherein the external-source navigation quantities of step (a) include an external-source three-coordinate vehicle position, the observations of step (b) including a plurality of observations derived from values of the external-source three-coordinate vehicle position for a plurality of input intervals.

25. The method of claim 1 wherein the external-source navigation quantities of step (a) include external-source satellite positions of a plurality of GPS satellites, the observations of step (b) including a plurality of observations derived from values of external-source satellite positions of a plurality of GPS satellites for a plurality of input intervals.

26. The method of claim 1 wherein the external-source navigation quantities of step (a) include external-source pseudoranges to a plurality of GPS satellites, the observations of step (b) including a plurality of observations derived from the values of external-source pseudoranges to a plurality of GPS satellites for a plurality of input intervals.

27. The method of claim 1 wherein the corrected or computed navigation quantities of step (d) include a corrected external-source three-coordinate vehicle position, the observations of step (b) including a plurality of observations derived from values of the corrected external-source three-coordinate vehicle position obtained for a plurality of input intervals.

28. The method of claim 1 wherein the corrected or computed navigation quantities of step (d) include computed pseudoranges to a plurality of GPS satellites, the observations of step (b) including a plurality of observations derived from values of the computed pseudoranges for a plurality of input intervals.

29. The method of claim 1 wherein the external-source navigation quantities of step (a) include external-source pseudonanges to a plurality of GPS satellites and the corrected or computed navigation quantities include computed pseudoranges to a plurality of GPS satellites, the observations of step (b) including a plurality of observations derived from the differences of the external-source pseudoranges and the computed pseudoranges obtained for a plurality of input intervals.

30. The method of claim 29 wherein the derivation of a plurality of observations is accomplished by summing the weighted differences of the external-source pseudoranges and the computed pseudoranges for a plurality of present and past input intervals.

31. The method of claim 1 wherein step (c) comprises the step:

(c1) obtaining component values for an error-state vector at observation intervals by using the observations of step (b) in a Kalman filter process, the error-state vector constituting the correction data.

32. The method of claim 31 wherein the components of the error-state vector include errors in vehicle position in a horizontal plane, errors in vehicle velocity in a horizontal plane, GPS vehicle clock bias and clock rate bias, GPS satellite clock biases for a plurality of satellites, barometric altitude bias at a first reference altitude, and the offset of the barometric altitude bias at a second reference altitude.

33. The method of claim 1 wherein the correction data of step (c) is a Kalman filter error-state vector, step (d) comprising the steps:

(d1) determining the time rate-of-change of the error-state vector by applying a dynamics matrix to the error-state vector;

(d2) obtaining corrections to a plurality of external-source navigation quantities by adding the integral of the time rate-of-change of the error-state vector to the error-state vector.

34. The method of claim 1 wherein the external-source navigation quantities of step (a) includes terrain altitude stored in an external memory as a function of vehicle position in the horizontal plane and external-source vehicle position in the horizontal plane, a value of terrain altitude being obtained by addressing the external memory with the external-source vehicle-position coordinates.

35. The method of claim 1 wherein the external-source navigation quantities of step (a) includes terrain altitude stored in an external memory as a function of vehicle position in the horizontal plane and the corrected or computed navigation quasntities of step (d) includes corrected external-source three-coordinate vehicle position, a value of terrain altitude being obtained in step (a) by addressing the external memory with the horizontal-plane coordinates of the corrected external-source three-coordinate vehicle-position.

36. The method of claim 1 wherein an observation of step (b) is ignored in performing step (c) if the quality of the observation is less than a specified quality level.

* * * * *